United States Patent [19]
Muir et al.

[11] Patent Number: 4,745,595
[45] Date of Patent: May 17, 1988

[54] DISTRIBUTED ELECTRONIC MAILBOX SYSTEM

[75] Inventors: Leslie Muir, Glasgow; John Smith, Falkirk; Andrew McKechnie, Glasgow, all of Scotland

[73] Assignee: Unisys Corporation, Blue Bell, Pa.

[21] Appl. No.: 877,774

[22] Filed: Jun. 24, 1986

[30] Foreign Application Priority Data
Sep. 20, 1985 [GB] United Kingdom ................ 8523246

[51] Int. Cl.$^4$ .......................... H04J 3/02; H04J 3/16
[52] U.S. Cl. ........................................ 370/85; 370/96
[58] Field of Search ............ 370/89, 90, 96, 85, 370/94; 340/825.08

[56] References Cited
U.S. PATENT DOCUMENTS

| | | | |
|---|---|---|---|
| 3,633,169 | 5/1970 | Bickford | 370/90 |
| 4,511,958 | 4/1985 | Funk | 370/85 |
| 4,596,012 | 6/1986 | Reed | 370/85 |

FOREIGN PATENT DOCUMENTS
0119039 9/1984 European Pat. Off. .

Primary Examiner—Douglas W. Olms
Assistant Examiner—Frank M. Scutch, III
Attorney, Agent, or Firm—Mark T. Starr

[57] ABSTRACT

The disclosure describes an electronic mailbox system in which a plurality of like data terminals are provided coupled to a common message carrying facility such as a telephone line wherein any terminal is capable at any selected time of being designated a controlling terminal; and further, wherein any terminal may either transmit or receive messages from any other terminal in the system. The system of the present disclosure is characterized by its ability to maintain effective communication among the terminals despite the occasional or intermittent linking of the terminals into the system. Thus, if a terminal is destined to receive a message but is not on-line or for any other reason does not receive the transmitted message, the system will continue to present the message from time to time until it is received by the destined terminal.

18 Claims, 7 Drawing Sheets

DISTRIBUTED ELECTRONIC MAILBOX SYSTEM

BACKGROUND OF THE INVENTION

The present invention relates to an electronic mailbox system wherein a plurality of provided data terminals are coupled to a common message carrying facility wherein any terminal within the system may transmit stored messages to any other terminal within the system and wherein any terminal within the system may be caused to receive messages destined for it from any other terminal in the system.

The proliferation of distributed networks relying upon data communication has engendered the use of many data terminals on a common line in one location intermittently coupled to one or more other terminals at other locations by means of a public telephone system. Data communication systems cannot readily assure communication between terminals under such circumstances. The present invention seeks to provide an electronic mailbox data communication system wherein occasional or intermittent linking of terminals into the system does not affect the system's capacity to communicate.

SUMMARY OF THE INVENTION

In a preferred embodiment, a plurality of data terminals may be linked either permanently or temporarily into a common message carrying facility such as a public telephone network. Any one of the terminals may be designated the controlling terminal and may be caused to supervise the running of the electronic mailbox facility. Each terminal consists in a data originating source such as a keyboard or a data processor and includes a communications controller for direct connection to the network.

In the preferred embodiment communication is achieved one byte at a time using a data word comprising a three-byte address identifier and a text character sent twice. The address character sent by the network controlling terminal is a destination address character whereas the address character sent by all other terminals is an originating address character. The text character is sent twice for errors to be detected therein if the first and second received versions do not agree with one another.

A system of handshaking between terminals is achieved whereby a message is transmitted in its entirety from an originating terminal with its destination address contained within its text. If the destination terminal is not on line or for some other reason does not receive the message, the originating terminal automatically closes down. Thus, messages will be presented onto the system from time to time until the destination terminal receives the message.

The network controlling terminal polls each of the other terminals in turn allowing them to transmit if the other terminal has any messages to be sent.

DESCRIPTION OF THE DRAWINGS

The present invention is further explained, by way of an example, by the following description taken in conjunction with the appended drawings in which:

FIG. 1 shows the overall configuration of the network embodying the present invention.

DESCRIPTION OF THE INVENTION

Figure 1:
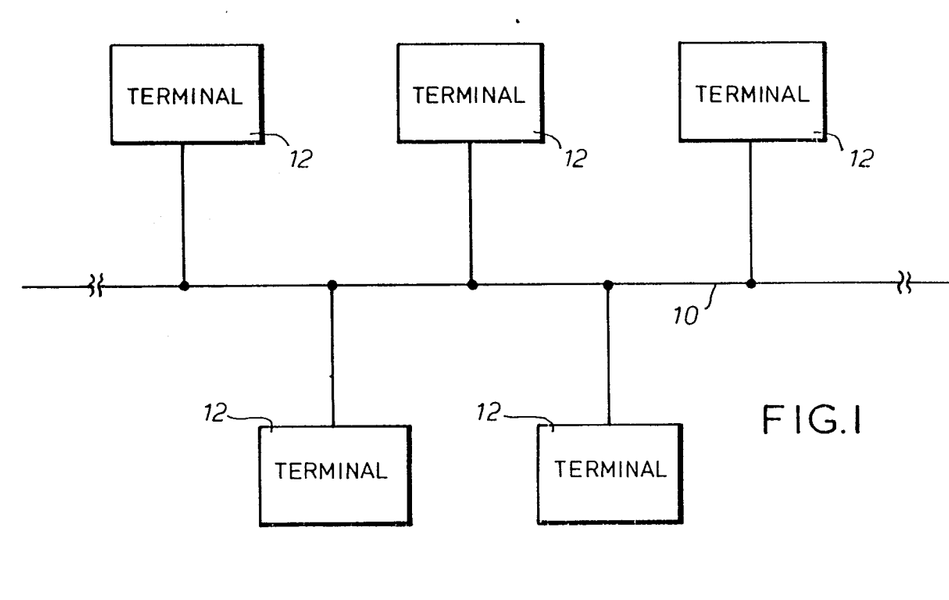
FIG. 1 shows a number of terminals according to the present invention linked to a common data network.

Referring to FIG. 1, a common communications line 10 supports a plurality of terminals 12. The terminals 12 are operative both to originate and to receive messages from the common communications line 10. The terminals 12 may be permanently connected into the common communications line 10 or may be intermittently connected by means of a telephone switching system or other means. Some terminals 12 may be permanently connected together and other terminals 12 may from time to time become connected onto the common communciations line 10.

Figure 2:
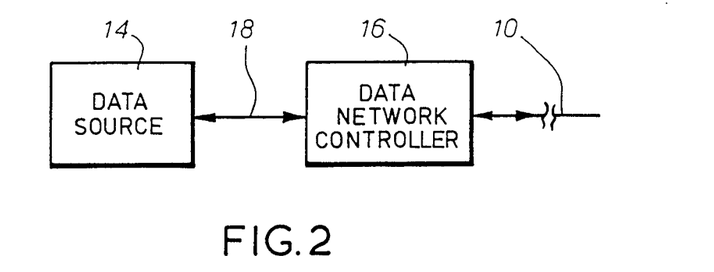
FIG. 2 shows the component parts of the data network shown in FIG. 1.

FIG. 2 shows a block diagram of each terminal 12 of FIG. 1. Each terminal 12 comprises a data source 14 which can be an electronic keyboard, data processor, or indeed any type of equipment capable of originating a message in digital form to be communicated over the common communications line 10.

Each terminal 12 further comprises its own individual data network controller 16 bi-directionally coupled 18 to the data source 14 and providing communication onto the network. Data source 14 provides digital data in the form of parallel binary digit words which are turned into a serial succession of data words to be sent over the communications line 10.

Figure 3:
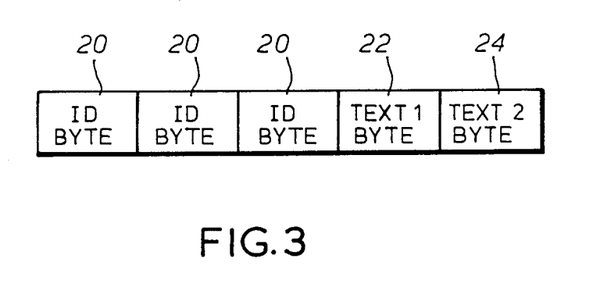
FIG. 3 shows the form of messages sent between the terminals on the data network.

FIG. 3 shows a data word as sent on the line 10. The data word comprises a concatenation of three 8-bit identification (ID) bytes followed by a concatenation of two 8-bit text bytes. The identification or address bytes 20 are used by that terminal 12 operating as the network control terminal to address instructions to the other terminals 12 and are used by all other terminals 12 as an indication of the origin of a message on the system.

The text bytes are separated into a first text byte 22 and a second text byte 24, both of which are identical to one another. When a message is received from the network, if the first text byte 22 is not identical with the second text byte 24, then a receiving error is detected and flagged.

Figure 4:
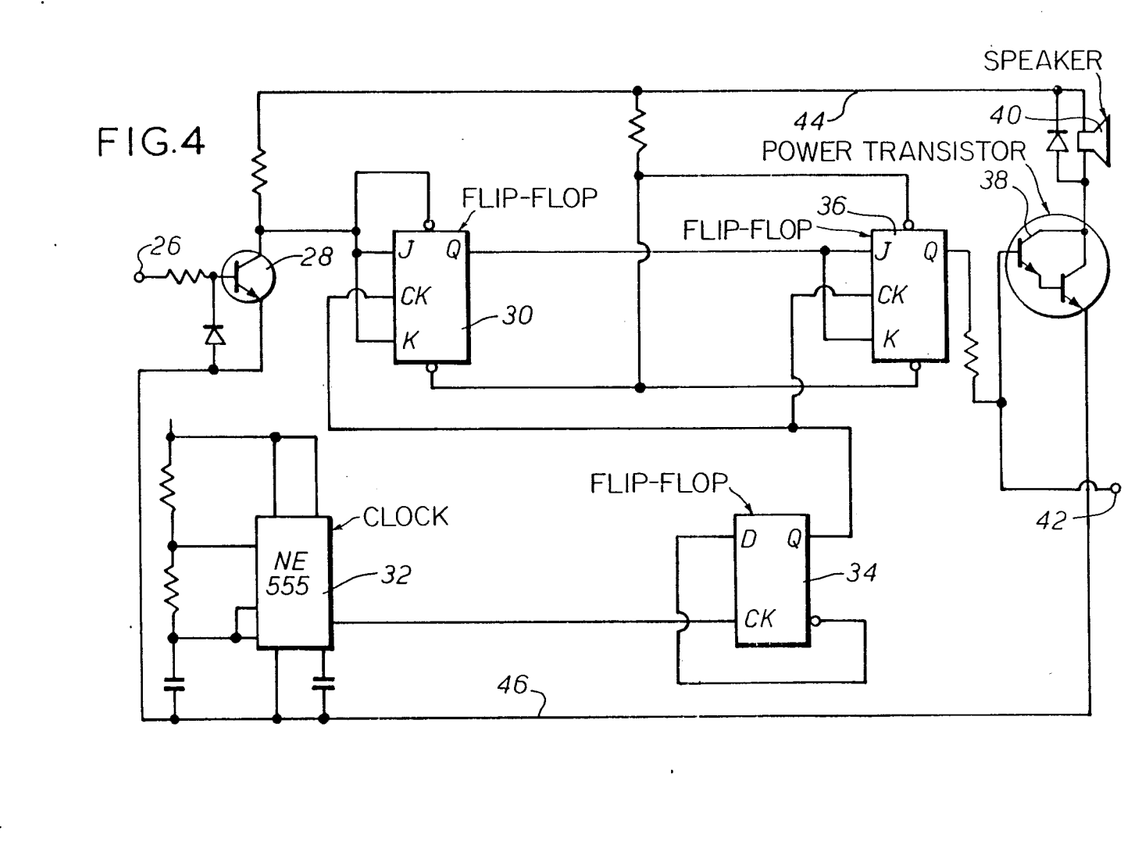
FIG. 4 shows an exemplary transmission encoder used in the data network controller otherwise shown in FIG. 2.

Each of the network controllers 16 communicates with the line 10 by means of an acoustic modem. FIG. 4 shows an exemplary schematic diagram of such a transmission portion of a modem. A data input connection 26 receives digital data and is used to drive a first transistor 28 whose output controls whether or not a first J-K flipflop 30 toggles in response to the output of a clock source 32 operating at 8 KHz and divided by two and rendered symmetric by a toggling first D-type flipflop 34, the output of the first J-K flipflop 30 in turn controlling the toggling of a second J-K flipflop 36 whose output is thus rendered to be either a first frequency or double that first frequency depending upon the polarity of the digital signal on the data input connection 26. The output of the second J-K flipflop 36 drives a power transistor 38 which energizes a loudspeaker device 40 to drive sound into the mouthpiece of a telephone handset (not shown). A loudspeaker disabling terminal 42 may be taken to ground potential to prevent the power transistor 38 from being driven. The whole encoding mechanism shown in FIG. 4 is powered between a power rail 44 and a ground rail 46.

Figure 5:
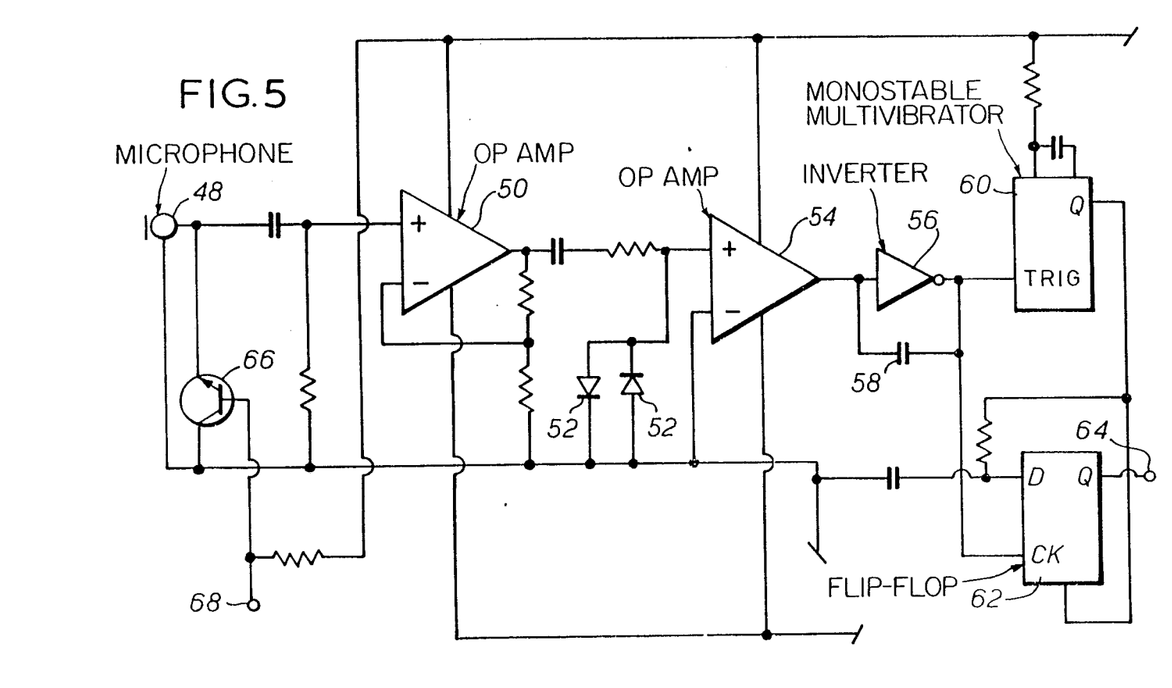
FIG. 5 shows an exemplary data receiving decoder used in conjunction with the data network controller otherwise shown in FIG. 2.

FIG. 5 shows an exemplary data signal receiver and decoder used with the data network controller 16 in each terminal 12 as shown in FIG. 2.

A microphone 48 receives sound signals from the earpiece of a telephone handset (not shown) which are coupled as input to an operational amplifier 50 coupled in non-inverting amplifying mode as is well known in the art. The output of the operational amplifier 50 is clipped by a pair of clipping diodes 52 and provided as input to a level shifter 54 whose output is a logic signal acceptable to the following logic devices. The output of the level shifter 54 is inverted and filtered by a logic inverter 56 with a filter capacitor 58 coupled between its input and output.

The output of the logic invertor 56 is coupled as input to trigger a re-triggerable monostable 60 whose timing is such that its output remains permanently high if the higher of the two frequencies on the line 10 is received, but whose output times out and thus switches up-and-down if the lower of the two frequencies is presented onto the line 10.

The output of the logic inverter 56 is also coupled as the clocking input to second D-type flipflop 62 whose D input is coupled to the output of the monostable multivibrator 60 which also serves to reset the second D-type flipflop 62. If the monostable multivibrator 60 times out, the second D-type flipflop 62 is clocked with a low input and the output 64 of the second D-type flipflop 62 stays false. If the higher of the two frequencies on the line 10 is being received, the second D-type fliflop 62 is clocked while its input is high and while its reset pin does not cause the second D-type flipflop 62 to be reset and the output 64 of the second D-type flipflop 62 becomes and remains high.

A second transistor 66 is coupled to shunt the microphone 48 if a disabling terminal 68 is grounded by means of a switch or a pushbutton (not shown) for testing the function of the decoder shown in FIG. 5.

Before proceeding to describe the flowcharts of FIGS. 6, 7 and 8, attention is first drawn to Table 1 below showing the common transmission code used over the line 10. Each data controller 16 accepts input from its data source 14 and employs a lookup memory using data from the data source 14 as an address to convert its incoming data to the common code shown in Table 1.

TABLE 1

| CODE | MEANING | CODE | MEANING |
|---|---|---|---|
| 0 | Null Character | 47 | / |
| 13 | Return | 48 | 0 |
| 14 | Switch to lower case | 49 | 1 |
| 15 | Switch to upper case | 50 | 2 |
| 16 | RVS OFF ⎫ Inverse | 51 | 3 |
| 18 | RVS ON ⎭ video | 52 | 4 |

TABLE 1-continued

| CODE | MEANING | CODE | MEANING |
|---|---|---|---|
| 19 | Home (Cursor) | 53 | 5 |
| 20 | Delete | 54 | 6 |
| 28 | Cursor right | 55 | 7 |
| 29 | Cursor left | 56 | 8 |
| 30 | Cursor up | 57 | 9 |
| 31 | Cursor down | 58 | : |
| 32 | Space | 59 | ; |
| 33 | ' | 60 | |
| 34 | " | 61 | = |
| 35 | // | 62 | |
| 36 | $ | 63 | ? |
| 37 | % | 64 | @ |
| 38 | & | 65-90 | A-Z (Alphabet) |
| 39 | . | 91 | [ |
| 40 | ( | 92 | |
| 41 | ) | 93 | ] |
| 42 | * | 94 | / |
| 43 | + | 95 | - |
| 44 | , | 96 | Ready? (i.e. CTS) |
| 45 | - | 97 | O.K. (i.e. RTS) Also error - check o.k. |
| 46 | . | 98 | Text Error |

Thus, each data terminal 12 may have its own lookup memory for code conversion. The code retrieved from the individual lookup memories is then turned from parallel to serial data for transmission.

Likewise, during reception of data from the line 10, each controller 16 receives data from the line in the code shown in Table 1 and using that data as an address for a further lookup table, converts from the code of Table 1 used on the line 10 into the particular code employed for the data source 14 associated with each terminal 12. In this way, any terminal may communicate with any other terminal despite differences in the coding employed by each data source 14.

In Table 1, attention is drawn to Codes 96, 97 and 98. The Code 96 is a "Ready" code employed to interrogate a particular terminal 12 in the system to see if it has a message to send. The network controlling terminal (whichever one of the terminals 12 it may be) sends out an address directed to one of the terminals 12 together with the "Ready" Code 96. If that terminal has data to send, it responds with an "O.K." Code 97 to which its own address has been tagged. The "Text Error" Code 98 indicates that the first and second text bytes 22,24 do not agree with one another and that data reception has not been properly achieved.

Apart from Codes 96, 97 and 98, there is one other code, not shown in Table 1, that being Code 99. Code 99 indicates that the text is not to be error checked and, in a manner which will be apparent to those skilled in the art, the message receiving terminals 12 in the system do not perform the check to see if the first text byte 22 agrees with the second text byte 24.

Figure 6:
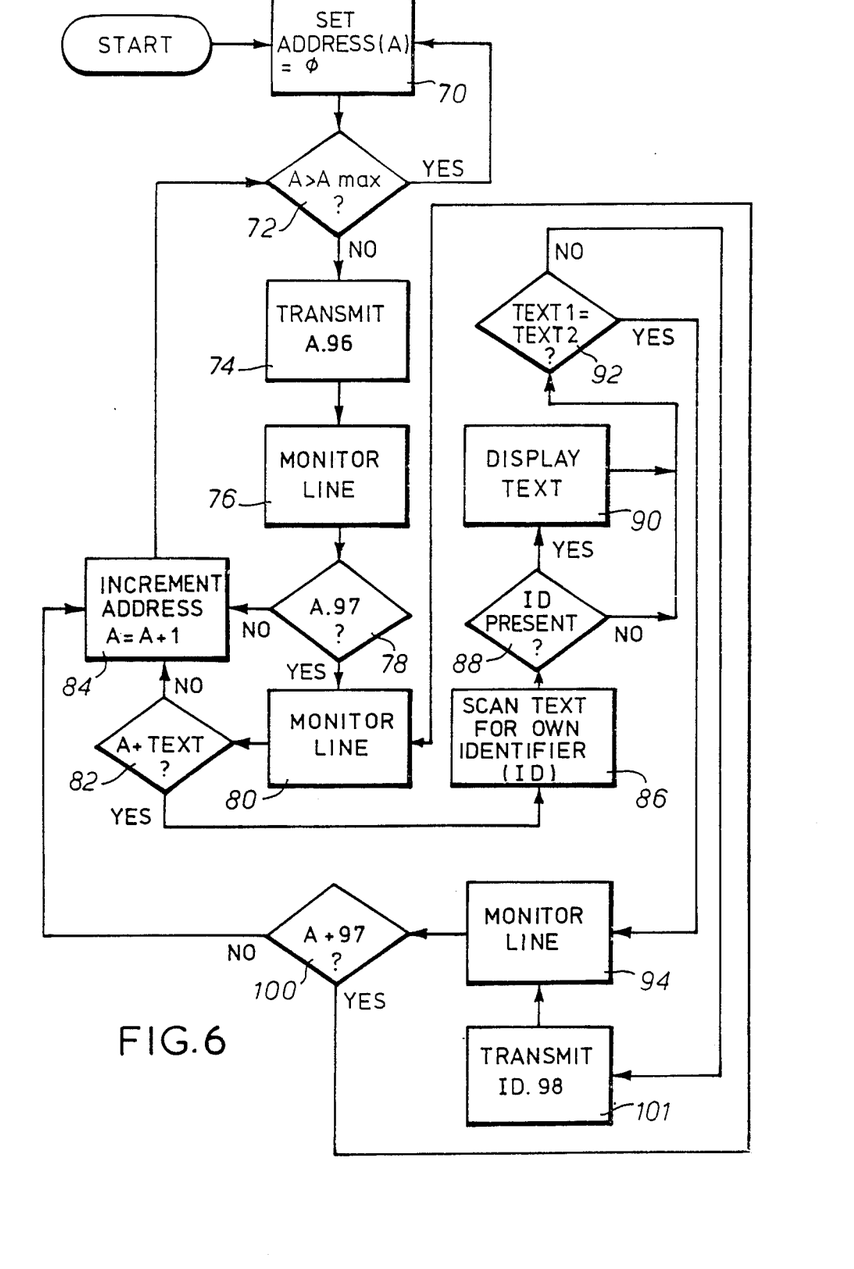
FIG. 6 is a flow chart showing the activities of that terminal in the network which is operating as the overall network control terminal.

FIG. 6 is a flowchart showing the operation of that terminal 12 which is designated the controlling terminal of the network. Any terminal 12 in the network may assume this role. It is simply necessary for the operator of that terminal to instruct his machine to enter the network control terminal mode as illustrated in FIG. 6. If no other terminal is acting as network control terminal, then no terminal will be interrogated and more than a predetermined amount of time will elapse without a Code 96 signal being received by the user's terminal. Thus, if a terminal 12 has not received such a Code 96 for more than that predetermined time (depending upon the maximum size of the network), that terminal knows that there is no terminal acting as the network control terminal and accordingly may take over control of the network if so requested by the user.

That terminal 12 becoming network controller in a first operation 70 sets an address A equal to zero. In a first test 72, the current address A is tested to see it has exceeded an upper limit Amax. If it has exceeded the upper limit Amax, control is returned to the first operation 70; otherwise, control is passed to a second operation 74 wherein the network controlling terminal transmits the address A as three address bytes 20 followed by the "Ready" Code 96 repeated twice. This has the effect of causing that terminal 12 which has as a prestored identification address the current address A, to be accessed with a request to see if it has any message to send. If the destination terminal 12 is not connected to the line 10 or has no message to send, it will not respond. If it does have a message to send, it will respond with its own identification address in the address bytes 20 followed by Code 97 repeated twice which indicates that it is ready to send a message. Thus, the network controlling terminal 12 whose operation is shown in FIG. 6 performs a third operation 76 wherein it monitors the line 10 and decodes data therefrom seeking the "OK" Code 97 from the terminal 12 having the address it last sent A. If a second test 78 detects the "OK" Code 97, then the overall network controlling terminal 12 in a fourth operation 80 once again monitors the line 10 looking for the presence of a following message in the form of the address of the last accessed terminal 12 (A) followed by a pair of identical text characters 22, 24. This is tested for in a third test 82 and if no message is received within a predetermined time, a fifth operation 84 increments the address A and returns control to the first test 72. Thereafter, the terminal 12 having that address (A+1) next higher than the last used address (A) is interrogated to see if it might have a message to send, and so on until the terminal with maximum address Amax is reached, when control, once again via the first operation 70, returns attention to the terminal 12 with the lowest address (A=0).

If the third test 82 detects the address of the last interrogated terminal 12 together with some text characters (22,24), a sixth operation 86 monitors the text characters 22,24 one by one to see if network controlling terminal 12 has been addressed by the text. A fourth test 88 tests if the ID identifier address, characteristic of the terminal 12 and prearranged, has been found in the series of text characters 22,24; and if it has been found, a seventh operation 90 displays the text as it is subsequently received. If the ID identifier has not been found, control is passed directly to a fifth test 92 which checks that the first text byte 22 equals the second text byte 24. If such equality is found, control is transferred to an eighth operation 94 which monitors the line seeking the presence of the Code 97 "OK" character (tested for by a sixth test 100) which is sent by the message originating terminal if further data bytes are to be sent. If the Code 97 "OK" signal is received, control is transferred to the fourth operation 80 which once again starts looking for a further character. If no "OK" Code 97 is detected by the sixth test 100, control is transferred to the fifth operation 84 where the address A is incremented and a new terminal 12 interrogated.

If the fifth test 92 does not detect equality between the first 22 and second 24 text bytes, control is passed to a ninth operation 101 which causes the network controlling terminal 12 to transmit its own identification address ID as the address bytes 20 and a repeated "Text Error" Code 98 which is received by the message originating terminal 12 and causes it to retransmit the previously sent text bytes 22,24 once again.

Figure 7:
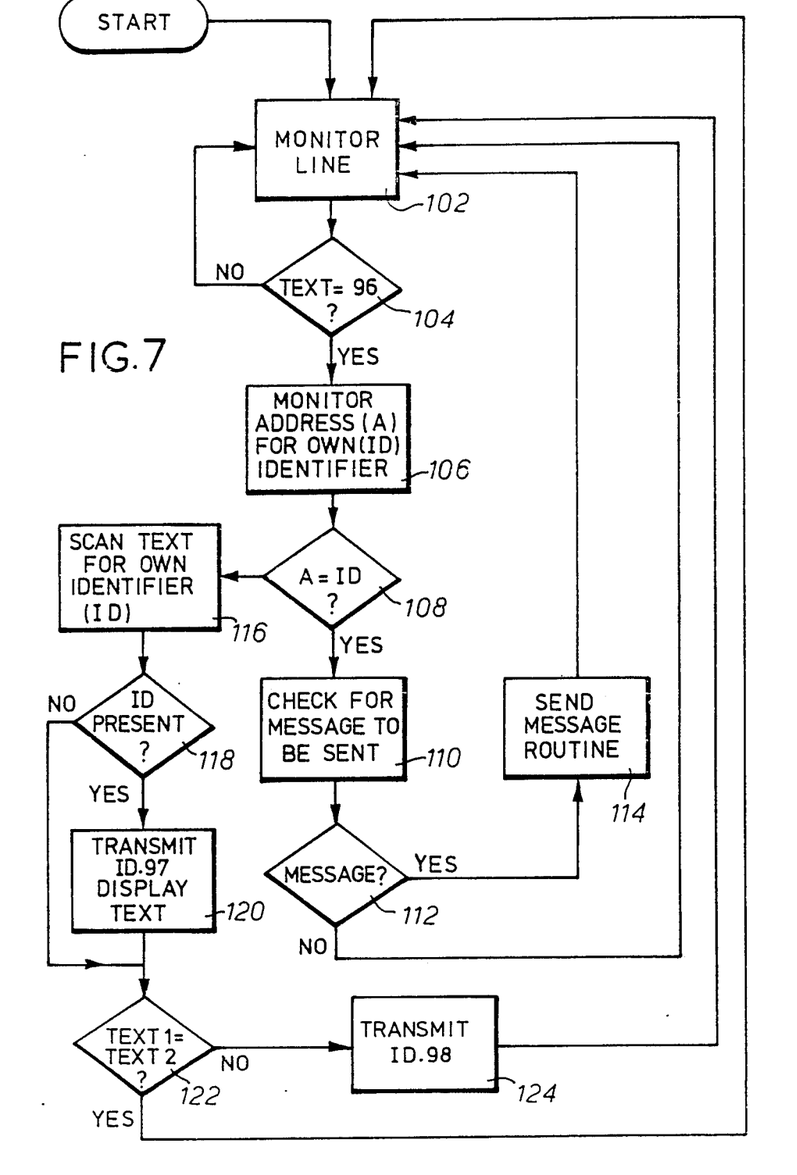
FIG. 7 is a flow chart showing the activity of all terminals in the system not acting as the overall network control terminal.

FIG. 7 shows the operation of all other terminals 12 in the network other than the terminal designated as the network controlling terminal.

In a tenth operation 102, the individual terminals 12 monitor the line 10 for the text characters 22,24 received therefrom to detect the "Ready" Code 96. A seventh test 104 looks for the "Ready" Code 96 and if it is received, the terminal monitors the address portion 20 of the incoming data word to see if the address (A) therein is equal to its own identifier address (ID). The address monitoring is performed by an eleventh operation 106 and if equality is detected (by an eighth test 108) between the received address A and the local identifier address ID, control is passed to a twelfth operation 110 which checks inside the individual terminal 12 to determine whether or not a message is to be sent to any of the other terminals 12.

If a ninth test 112 detects such a message to be sent, control is passed to a "Send Message" 104 routine 114 more fully described with reference to FIG. 8, the routine of FIG. 8 exiting back to the tenth operation 102. If no message is to be sent, the ninth test 112 returns control straight back to the tenth operation 102.

If the eighth test 108 fails to detect the received address A equal to the local identifier address ID, it may be that messages are being sent on the line 10. Accordingly, the eighth test 108 passes control to a thirteenth operation 116 where the incoming text characters 22,24 are scanned to see if they contain the local identification address ID indicating that an incoming message is destined for that particular terminal 12. If a tenth test 118 detects the identifier ID in the incoming text characters 22,24, it passes control to a fourteenth operation 120 which displays the characters on the local terminal 12 screen or printer (not shown) and also transmits an "OK" Code 97 signal indicating that a message has been received, using its local identity address ID as the address portion 20 of the transmitted data word. As will later be seen with reference to FIG. 8, this has the effect of confirming to the message originating terminal 12 that its message is being received and that transmission should continue.

Both the fourteenth operation 120 and the tenth test 118 (in the event of the tenth test 110 not finding the local identifier address ID in the received text) pass operation to an eleventh test 122 which looks for equality between the first 22 and the second 24 text bytes received. If it detects no equality, control is passed to a fifteenth operation 124 causing the individual terminal 12 to transmit a data word having its own local identity address ID as the address portion 20 and the "Text Error" Code 98 signal repeated as the text bytes 22,24. As will become apparent from FIG. 8, this has the effect of causing the message originating terminal 12 to retransmit its last bytes of text 22,24. The fifteenth operation 124 passes control directly back to the tenth operation 102.

If the eleventh test 122 detects equality between the first 22 and second 24 text bytes, it passes control directly back to the tenth operation 102.

Figure 8:
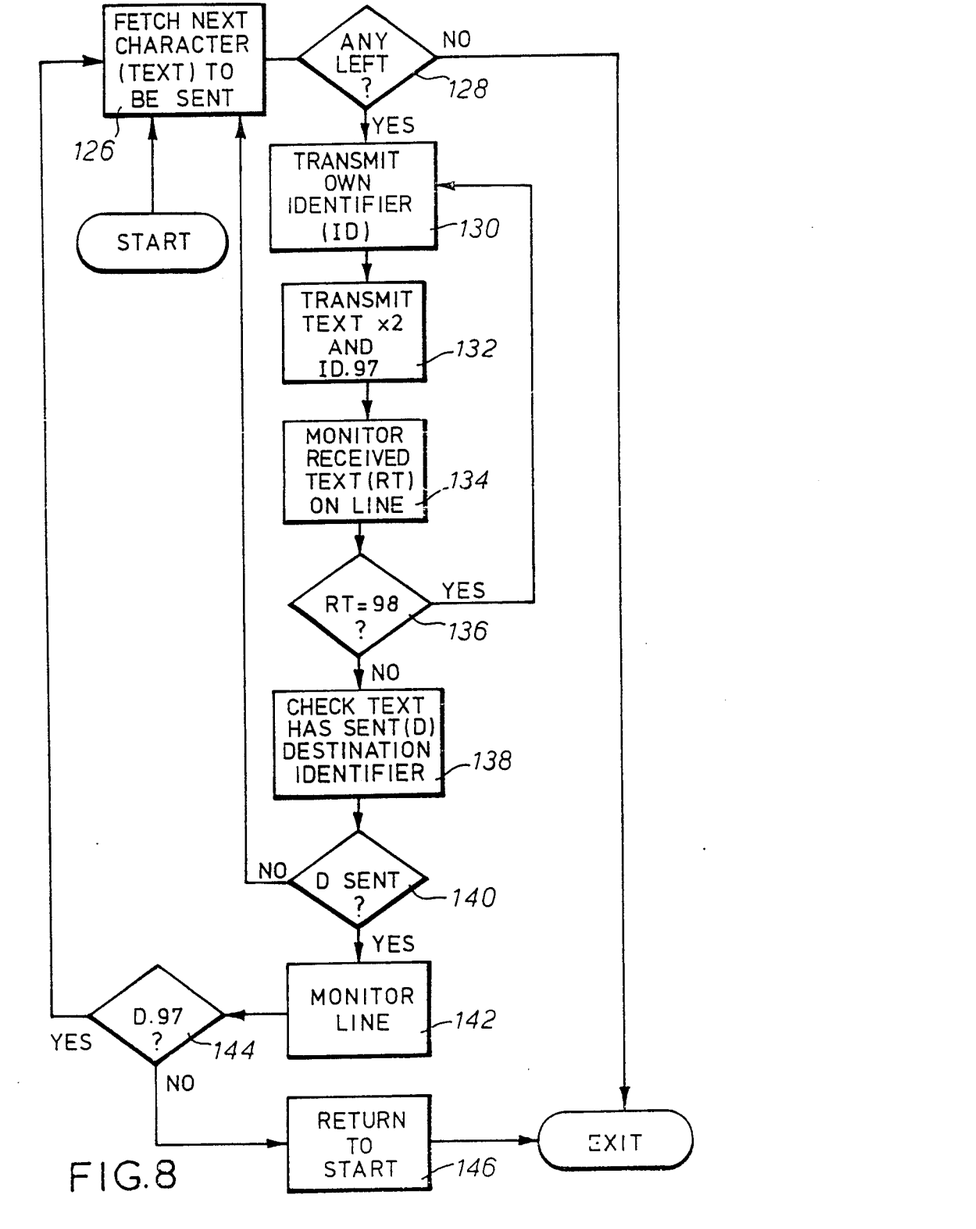
FIG. 8 is a flow chart showing the send message routine of FIG. 7.

FIG. 8 shows a flowchart of the "Send Message Routine" of FIG. 7.

A sixteenth operation 126 attempts to recall the next character (TEXT) from a memory within each terminal 12. If a twelfth test 128 detects no further characters (TEXT) ready to be sent, it directly exits from the message sending routine back to the tenth operation 102 of FIG. 7.

If the twelfth test 128 detects characters (TEXT) still to be sent, it passes control to a seventeenth operation 130 which sends the terminals 12 own local identifier address ID to form the address portion 12 of the data word shown in FIG. 3.

Thereafter, an eighteenth operation 132 firstly sends out the retrieved character (TEXT) twice to form the first and second text bytes 22,24 of FIG. 3 and secondly sends out the "OK" Code 97 with its own local identity address as the address portion of the data word to indicate that it still has material to send.

Thereafter, the terminal 12, in a nineteenth operation 134, monitors the line 10 to see if it receives a "Text Error" Code 98 signal and if a thirteenth test 136 detects the Code 98, it returns control to the seventeenth operation 130 for retransmission of the last character (TEXT).

If the thirteenth test 136 does not detect the "Text Error" Code 98, it passes control to a twentieth operation 138 which checks to see if the identity code address D of the terminal 12 for which the message is destined has been sent in the body of the text 22,24. If a fourteenth test 140 does not detect that the destination terminal identifier D has been sent in the text, it passes control back to the sixteenth operation 126 for a further character (TEXT) to be sent. If the fourteenth test 140 detects that the destination terminal 12 identifier address D has been sent in the text 22,24, it passes control to a twenty-first operation 142 which monitors the line 10 looking for the "OK" Code 97 back from the message destination terminal 12 indicative of the destination terminal 12 having decoded its ID identifier address from the text. If a fifteenth test 144 detects the "OK" Code 97 returning from the destination terminal 12, it passes control back to the sixteenth operation 126 for the rest of the message to be transmitted as alternate data words according to FIG. 3 of data bytes and the "OK" Code 97.

If the fifteenth test 144 does not detect the "OK" Code 97 acknowledgement back from the message destination terminal 12, it means either that there is a fault or that the destination terminal is not, at that moment, connected into the line 10. In either case, the message cannot be sent. The fifteenth test 144 sends control to a twenty-second operation 146 which returns the message to its beginning ready for re-transmission at a later time, before exiting the routine back to the tenth operation 102 of FIG. 7.

The individual identity addresses of the terminals 12 may be given to each terminal 12 and stored therein by a master controller on the line 10 on each occasion of powering up of the network. Alternately, the identifiers ID may be mailed secretly to the terminal user for the user to program the identifier ID into his own machine for the identifier ID to remain secret except to those users to whom he wishes to divulge the identifier ID.

We claim:

1. In a data communications network including a plurality of like terminals coupled to a common communication channel, each of said terminals being adapted to transmit messages to any other terminal within the network and receive messages destined to it from any other terminal within the network, a method comprising:
   a—at any given time selecting as a first terminal any one of said plurality of like terminals; and
   b—said first terminal monitoring whether any terminal other than said first terminal is operating in a network control terminal mode as indicated by an interrogation message on said channel; and
   c—said first terminal responding to said monitoring indicating that no other terminal is operating in said network control terminal mode by entering the network control terminal mode.

2. The method according to claim 1 wherein said step of monitoring whether any terminal other than said first terminal is operating in a network control terminal mode includes the substep of:
   b1—said first terminal concluding that no other terminal is operating in said network control terminal mode, if an interrogation message is not detected within a first predetermined time.

3. The method according to claim 2 wherein said first predetermined time is dependent upon a maximum number of terminals coupled to said channel.

4. The method according to claim 1 further including the following step after the step of said first terminal entering said network control terminal mode:
   d—said first terminal polling each of the other terminals in turn to determine if any of the other terminals has a message to transmit.

5. In a data communications network including a plurality of like terminals coupled to a common communication channel, each of said terminals being adapted to transmit messages to any other terminal within the network and receive messages destined to it from any other terminal within the network, a method comprising:
   a—at any given time selecting as a first terminal any one of said plurality of like terminals;
   b—said first terminal monitoring whether any terminal other than said first terminal is operating in a network control terminal mode as indicated by an interrogation message on said channel; and
   c—said first terminal responding to said monitoring indicating that no other terminal is operating in said network control terminal mode by entering the network control terminal mode; and
   d—said first terminal polling each of the other terminals in turn to determine if any of the other terminals has a message to transmit in accordance with the following substeps:
   d1—said first terminal setting a current address equal to zero;
   d2—said first terminal testing if the current address A exceeds an upper limit A max;
   d3—if the current address A exceeds A max, returning to the substep of said first terminal setting a current address equal to zero;
   d4—said first terminal transmitting an interrogation message including the current address A and a "Ready" code for interrogating the addressed terminal to see if it has a message to send;
   d5—said first terminal monitoring the channel for a response from the terminal having the then current address A assigned to it; and
   d6—and if no response is received from the terminal having the then current address A assigned to it within a second predetermined time, said first terminal incrementing the current address A and returning to the substep of said first terminal testing if the current address exceeds A max.

6. The method according to claim 5 further including the following steps after the step of said first terminal transmitting an interrogation message including the current address A and a "Ready" code:

e—said first terminal monitoring the response from the terminal having the then current address assigned to it to determine if the response is addressed to the first terminal;

f—if the response is addressed to the first terminal, the message from the terminal having the current address A is received by the first terminal until the end of the message is detected, after which the current address A is incremented by the first terminal and control is returned to the substep of said first terminal testing if the current address exceeds A max; and g—if the response is not addressed to the first terminal, the first terminal monitors the channel until the end of message is detected, after which the current address A is incremented by the first terminal and control is returned to the substep of said first terminal testing if the current address exceeds A max.

7. The method according to claim 4 further including the following steps:

e—each individual terminal other than said first terminal monitoring the channel for an interrogation message addressed to the respective individual terminal:

f—in response to the receipt of an interrogation message with an address corresponding to that assigned to the respective individual terminal, the respective individual terminal checks whether it has a message to be sent to another terminal;

g—if no message is to be sent, control is returned to the step of each individual terminal other than said first terminal monitoring the channel for an interrogation message addressed thereto:

h—if a message is to be sent, the respective individual terminal begins to transmit the message and continues such transmission until the entire message has been transmitted; and i—thereafter, control is returned to the step of each individual terminal other than said first terminal monitoring the channel for an interrogation message addressed thereto.

8. A data communications network comprising a plurality of terminals coupled to a common communication channel, wherein each of said plurality of terminals includes:

first means for operating as a network control terminal;

second means for detecting the absence of any other one of said plurality of terminals acting as the network control terminal; and third means, responsive to said second means detecting the absence of any other one of said plurality of terminals acting as the network control terminal, for commencing operation as the network control terminal, that terminal operating as the network control terminal including interrogating means for providing interrogating messages to other terminals in said network; and each terminal not acting as the network control terminal including monitoring means for monitoring said common communication channel for said interrogating messages and for commencing said operation as the network control terminal if an interrogating message is not detected on said common communication channel for longer than a first predetermined period, that terminal operating as the network control terminal including second interrogating means for providing on said common communication channel an interrogating message block, one of said interrogating message blocks being addressed in turn to each other terminal; and wherein each other terminal to which an interrogating message is addressed includes response means, responsive to receiving an interrogating message and having a text message to send, for providing a confirmatory message block on said common communication channel.

9. The network according to claim 8 wherein:

said text message is divided into text message blocks;

each other terminal to which an interrogating message is addressed and having a text message to transmit includes alternate means for providing alternately onto said common communication channel either a text message block or a repetition of said confirmatory message block; and wherein that terminal operating as the network control terminal includes monitoring means for monitoring said common communication channel and providing said interrogating message block to a further terminal in said network only if said confirmatory message block is not detected before elapse of a second predetermined period after providing said interrogating message.

10. The network according to claim 9 wherein:

each terminal is allocated an identifier address;

each terminal sending a text message includes address indicating means for including in the text message an address indicative of the identifier address of the destination terminal whereat the message is intended to be received;

each of said terminals not in the course of sending a text message includes text message monitoring means for monitoring the text message and, in the event of detecting its own identifier, for providing a return message block onto said channel indicative of receipt of the text message; and that terminal in the course of sending the text message includes return message means, responsive to a return message block not being detected, for abandoning providing said text message until the next instance of receipt of an interrogating message block.

11. The network according to claim 10 wherein:

each terminal, in the course of receiving a text message, includes error means for monitoring the text message for transmission errors and, if an error is detected, for providing an error indication block on said channel; and that terminal in the course of sending the text message includes repeat means for monitoring the channel after providing thereon each text message block and, if an error indication block is detected, for repeating the last provided text message block.

12. The network according to claim 11 wherein:

that terminal in the course of providing a text message includes non-check means for providing a non-check message block on said channel to indicate that the text message is not to be checked for errors; and any terminal receiving the text message includes non-check response means, responsive to detection of a non-check message block, for suspending checking the text message for transmission errors.

13. The network according to claim 12 wherein each block provided on said channel includes an address portion concatinated with a data portion.

14. The network according to claim 13 wherein:
the data portion of a text message block includes a data word provided twice; and
said error means includes means for checking that the first and second provided data words are identical.

15. The network according to claim 3 wherein:
the address portion of an interrogating message block includes the identifier address of that terminal which is to be interrogated to determine if it has a text message to send; and
the data portion of an interrogating message block includes a code indicative of interrogation.

16. The network according to claim 3 wherein:
the address portion of a confirmatory message block includes the identifier address of the terminal which has commenced receiving the text message; and
the data portion of a confirmatory message block includes a code indicative of confirmation of commencement of receipt of a text message.

17. The network according to claim 13 wherein:
the address portion of an error indicating message block includes the identifier address of the terminal where the error has been detected; and
the data portion of an error indicating message block includes a code indicative of a data error having been detected.

18. The network according to claim 8 wherein said common communication channel is a public telephone network.

* * * * *